United States Patent
Frank et al.

(10) Patent No.: US 8,539,979 B2
(45) Date of Patent: Sep. 24, 2013

(54) TWO-STAGE SOLENOID VALVE FOR AN ELECTROPNEUMATIC VALVE CONTROL UNIT

(75) Inventors: Dieter Frank, Hannover (DE); Juan Rovira-Rifaterra, Garbsen (DE); Armin Sieker, Bielefeld (DE); Andreas Teichmann, Isernhagen (DE)

(73) Assignee: WABCO GmbH, Hannover (DE)

( * ) Notice: Subject to any disclaimer, the term of this patent is extended or adjusted under 35 U.S.C. 154(b) by 769 days.

(21) Appl. No.: 12/311,035

(22) PCT Filed: Sep. 6, 2007

(86) PCT No.: PCT/EP2007/007760
§ 371 (c)(1), (2), (4) Date: Oct. 29, 2009

(87) PCT Pub. No.: WO2008/034524
PCT Pub. Date: Mar. 27, 2008

(65) Prior Publication Data
US 2010/0059697 A1    Mar. 11, 2010

(30) Foreign Application Priority Data
Sep. 20, 2006 (DE) .................... 10 2006 044 765

(51) Int. Cl.
*F16K 43/00*    (2006.01)

(52) U.S. Cl.
USPC ............ 137/614.14; 137/315.11; 251/129.21; 335/265

(58) Field of Classification Search
USPC .................. 251/129.21; 137/315.11, 614.11, 137/614.14; 335/265; 303/119.2
See application file for complete search history.

(56) References Cited

U.S. PATENT DOCUMENTS

| | | | | |
|---|---|---|---|---|
| 3,377,046 A * | 4/1968 | Frantz et al. | ............. | 251/129.21 |
| 4,102,526 A * | 7/1978 | Hargraves | ................ | 251/129.21 |
| 4,245,815 A * | 1/1981 | Willis | ........................ | 251/129.08 |
| 4,655,255 A * | 4/1987 | Rode | ........................... | 137/627.5 |
| 4,922,961 A | 5/1990 | Maehara | | |
| 5,199,459 A * | 4/1993 | Mullally | ....................... | 137/613 |
| 5,218,996 A * | 6/1993 | Schmitt-Matzon | ...... | 137/596.17 |
| 6,206,481 B1 * | 3/2001 | Kaisers et al. | ..................... | 303/7 |

(Continued)

FOREIGN PATENT DOCUMENTS

| | | |
|---|---|---|
| DE | 39 29 348 A1 | 3/1990 |
| DE | 100 09 116 A1 | 8/2001 |
| DE | 10 2004 035 763 A1 | 3/2006 |
| WO | WO 2006007970 A1 * | 1/2006 |

*Primary Examiner* — Eric Keasel
*Assistant Examiner* — Matthew W Jellett
(74) *Attorney, Agent, or Firm* — Kramer Levin Naftalis & Frankel LLP

(57) ABSTRACT

A two-stage solenoid valve for an electropneumatic valve control unit, e.g., a pilot control unit of a pressure modulator, includes a solenoid system to which a first and second current intensity can be applied as well as a solenoid valve device with a primary side connectable to a first compressed-air supply and a secondary side connectable to a second compressed-air supply. A primary valve encompassing an adjustable primary armature biased by a primary armature spring is provided on the primary side, and a secondary valve encompassing an adjustable secondary armature biased by a secondary armature spring is provided on the secondary side. The solenoid valve device can be a valve cartridge insertable from one side. Diameters of a front (in relation to insertion direction) region and a central region of the valve cartridge are smaller than or equal to the diameter of a rear region of the valve cartridge.

18 Claims, 2 Drawing Sheets

(56) References Cited

U.S. PATENT DOCUMENTS

| | | | |
|---|---|---|---|
| 6,412,884 B1 * | 7/2002 | Takayama et al. | 303/119.2 |
| 6,453,936 B1 | 9/2002 | Frank et al. | |
| 6,725,877 B2 * | 4/2004 | Liorati et al. | 137/486 |
| 7,905,557 B2 * | 3/2011 | Frank et al. | 303/118.1 |
| 2002/0124891 A1 * | 9/2002 | Frank et al. | 137/596 |
| 2007/0236084 A1 | 10/2007 | Frank et al. | |
| 2009/0236551 A1 * | 9/2009 | Nomichi et al. | 251/129.15 |

\* cited by examiner

TWO-STAGE SOLENOID VALVE FOR AN ELECTROPNEUMATIC VALVE CONTROL UNIT

FIELD OF THE INVENTION

The present invention generally relates to a two-stage solenoid valve for an electropneumatic valve control unit, especially, for a pilot control unit of a pressure modulator.

BACKGROUND OF THE INVENTION

DE 10 2004 035 763 A1 describes a solenoid valve of the general type under consideration, which is provided as the valve control unit for two brake ducts of an electropneumatic brake system. An air admission valve having a primary armature and a vent valve having a secondary armature are provided in one valve unit, the two magnet armatures having a common armature guide arrangement and a common solenoid system and being switched at different current intensities. Thus, air can be admitted to the downstream wheel module, the input pressure can be held and venting can be achieved by means of a common solenoid system.

The two-stage solenoid valve of DE 10 2004 035 763 A1 is assembled from both sides into the housing of the pilot control unit. Thus, armatures having an armature spring, armature guide tube with core and valve seat, respectively, are introduced from the primary or secondary side, respectively, into the common coil. The respective cores are pressed together in the middle. Closing elements fix the frame interiors of the solenoid systems of the plurality of valve units.

DE 100 09 116 A1 describes a valve device for the pilot control unit of a brake pressure modulator in a trailer having an electronic brake system. The solenoid valves are constructed as cartridge solenoid valves, with the valve cartridge placed in a housing having a solenoid. First, this solenoid is introduced into the housing, and then the valve cartridge is inserted into and joined to the housing.

SUMMARY OF THE INVENTION

Generally speaking, it is an object of the present invention to provide a two-stage solenoid valve for an electropneumatic control unit, wherein the valve permits safer operation and rapid, simple assembly.

A solenoid valve of this type can be provided, in particular, in the pilot control unit of a brake modulator, which, with its solenoid valves, activates an air-flow-boosting relay valve, which, in turn, can activate one or more ducts. For use in an electropneumatic brake system, such as an electronically regulated brake system (EBS) for vehicle trailers, wheel brake modules having brake cylinders for the wheel brakes are activated by the relay valve.

In accordance with exemplary embodiments of the present invention, a valve cartridge is provided that, by virtue of its cross section, which tapers to one side, can be introduced from one side. The valve cartridge can be inserted, in particular, as a stepped body into the magnet system, together with housed movable parts, such as, for example, armatures and springs.

The present invention offers several advantages.

The valve cartridge requires little space, is inexpensive and, advantageously, has low susceptibility to improper assembly.

Assembly from one side is possible, with simple options for fastening the magnet internals. Thereby, the receiving housing, such as, for example, a pilot control unit, is simpler.

Pre-assembled and pre-tested units can be built in. Thus, repair is also made easier.

Thermal expansion of the surrounding housing has no influence on the stroke tolerances and the armature forces.

Compared with conventional split cores, the one-piece core has the advantage that the magnetic flux is not hindered by a compression joint. The magnetic behavior remains constant over the number of pieces.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF PREFERRED EMBODIMENTS

Figure 3:
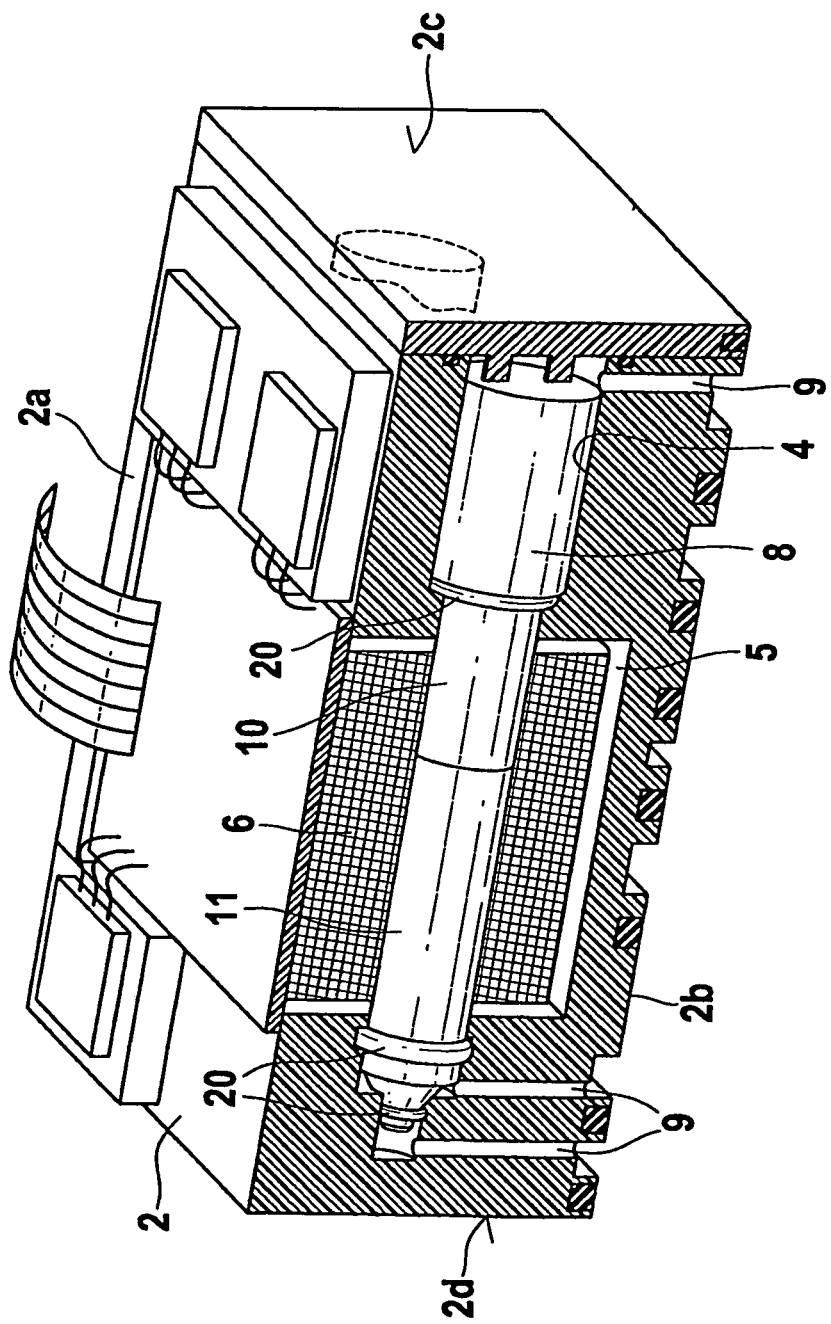
FIG. 3 is a sectional view taken through a pilot control unit containing a solenoid valve in accordance with an embodiment of the present invention.

Referring now to the drawing figures, a solenoid valve is provided for introduction into, for example, a pilot control housing 2 illustrated in FIG. 3. In pilot control housing 2, at least one valve bore 4 is provided, which extends in transverse direction from a side face 2c and which, according to exemplary embodiments of the present invention, can be formed as a blind bore so that the opposite side face 2d can be closed. Alternatively, valve bore 4 can also be formed as a through hole. In accordance with exemplary embodiments of the present invention, a plurality of valve bores 4 can be formed in parallel, and it is in this connection that the illustrated valve bore 4 will be described hereinafter.

In a molded pocket 5 formed starting from top side 2a of pilot control housing 2, which can be made of plastic, for example, a solenoid system 6 is introduced such that its central through hole coincides with valve bore 4. Solenoid system 6 is contacted with an electrical interface.

A valve cartridge 8 is introduced from side face 2c, or in other words, from its primary side, into valve bore 4 and is fastened to side face 2c. In this way, it fixes solenoid system 6, which was introduced from above, in vertical direction, meaning that it acts as a splint member; in addition, solenoid system 6 is also fixed by other bearing points in the surrounding housing. From its primary side 8a, which is shown on the right in FIG. 1, valve cartridge 8 is pressurized with compressed air, for example, via a compressed air duct 9 extending in vertical direction through pilot control housing 2, and at its secondary side 8b, on the left in FIG. 1, it discharges compressed air via at least one further compressed air duct 9 extending in vertical direction through pilot control housing 2.

Valve cartridge 8 is provided with a primary valve 10 and a secondary valve 11. In this exemplary embodiment, primary valve 10 is designed as a 2/2-way valve having one passing and one blocking position. Secondary valve 11 is designed as a 3/2-way valve, and it has an air admission or control pressure position and a venting position. In the air admission position, the compressed air arriving from primary valve 10 is discharged at an air admission output 12a, for example, for admission of air to a connected pressure cylinder of a wheel brake. In the venting position, first output 12a is in communication with a venting output 12b.

Primary valve 10 has a primary armature 10a with a diameter of 8 mm, for example, which is guided in axial direction in a magnetically non-conducting armature guide tube 10b made of brass or non-magnetic steel, for example, and is pre-loaded by an armature spring 10c into its open position, in which primary armature 10a is, therefore, not bearing on its primary valve seat 13.

Analogously, secondary valve 11 has a secondary armature 11a with a diameter of 6 mm, for example, which is guided in a magnetically conducting armature guide tube 11b, which is constructed in one piece together with core 15 and is advantageously joined rigidly to primary armature guide tube 10b. Secondary armature 11a is pre-loaded by an armature spring 11c, and it cooperates with a first valve seat 14a for first output 12a and with a second valve seat 14b for second output 12b; in the exemplary embodiments shown in the drawings, this valve seat 14a is always able to be open.

The magnetic flux through solenoid system 6 passes through both armatures 10a, 11a and common core 15 of magnetically conducting material formed between them. Anti-sticking elements 17 can be disposed between core 15 and armatures 10a, 11a, which ensure earlier drop-out at higher currents, for example, by pressing into core 15 or pressing against armatures 10a, 11a. For this purpose, an anti-sticking element 17, in the form of a bush acting as a spacer, for example, is provided between secondary armature 11a and core 15, while an air gap that diverts the magnetic flux passing through primary armature 10a radially outward can be formed between core 15 and primary armature 10a.

Both armatures 10a, 11a are displaced by common solenoid system 6, which, for this purpose, can be de-energized or else energized with a first lower current intensity or a second higher current intensity. Consequently, three switched positions are obtained:

(i) a de-energized home position in which primary valve 10 is open, air admission port 12a of secondary valve 11 is left open and vent port 12b is shut off;

(ii) a position during energization with the first lower current intensity in which only primary armature 10a is displaced and primary valve 10 is therefore closed; the spring force of primary armature spring 10c and the response of the rest of the valve system are therefore designed such that this system is already displaced at the first current intensity, whereas secondary armature spring 11c still holds secondary armature 11a; thus, vent port 12b continues to be shut off, and the pressure in air admission port 12a is held; and (iii) a position during energization with the second higher current intensity in which primary valve 10 continues to be closed and secondary armature 11a is also displaced, such that secondary valve 11 places air admission port 12a and vent port 12b in communication; in this way, venting can take place between air admission port 12a and vent port 12b.

The air therefore flows through an air inlet 19 into the primary valve, past (or through) primary armature 10a and, during air admission, or in other words, de-energized condition and open primary valve 10, past valve seat 13 into a central air bore 22 of core 15, from there into secondary valve 11, through secondary armature 11a, past valve seat 14a and into air admission port 12a.

As one example, core 15 is joined to primary armature guide tube 10b (e.g., made of brass) by adhesive bonding and flanging, or, as another example, is joined to armature guide tube 10b via seals. Secondary valve seats 14a, b are joined to core 15 by flanging or by seals, for example. As a result, a valve cartridge 8 containing the housed movable parts is formed.

A stepped body 18 is obtained, which houses armatures 10a, 11a and, on the primary side, has a cylindrical region 18a with larger diameter and, toward the left on the secondary side, has a cylindrical region 18b, 18c with smaller diameter, so that it can be introduced into solenoid system 6 or the through hole thereof, thus fixing it. Primary armature spring 10c is housed in larger region 18a and secondary armature 11c in narrower region 18b. A middle region 18c, which is located within solenoid system 5, is formed continuously with narrower region 18b housing secondary armature spring 11c.

Figure 1:
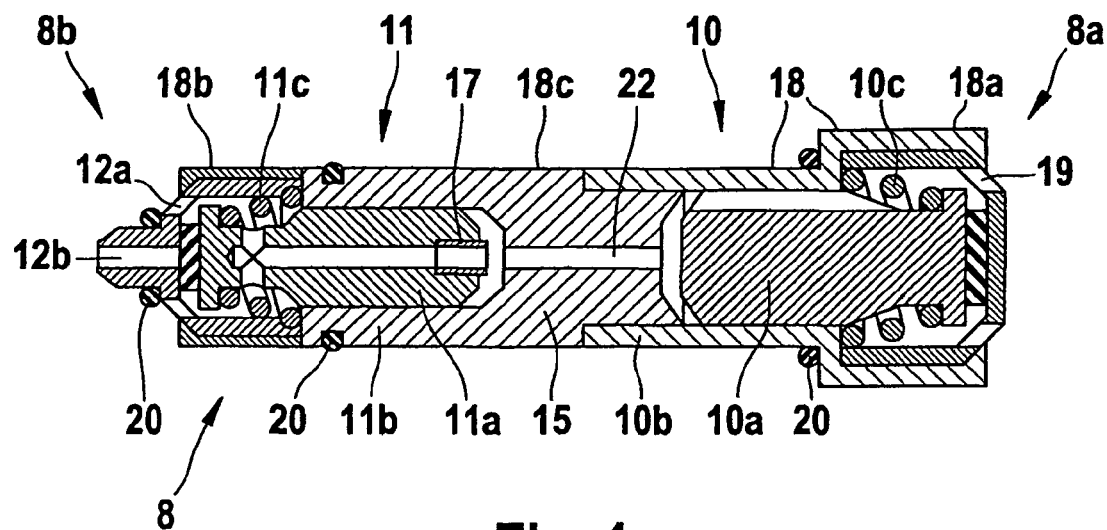
FIG. 1 is an axial sectional view taken through a valve cartridge of a solenoid valve in accordance with an embodiment of the present invention.
Figure 2:
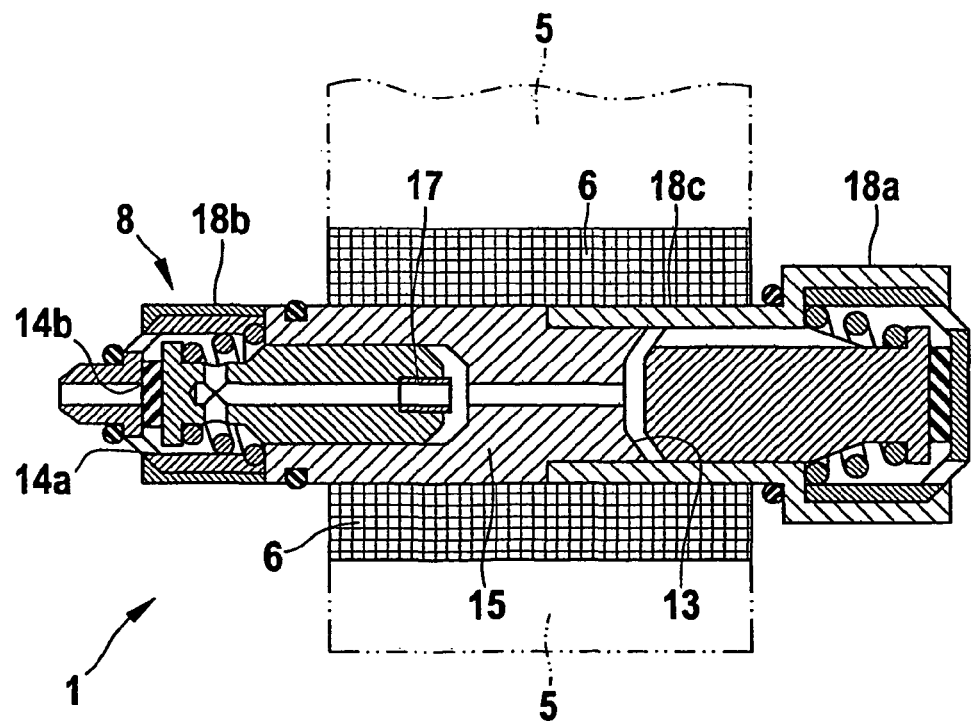
FIG. 2 is an axial sectional view taken through a solenoid valve with valve cartridge and solenoid in accordance with an embodiment of the present invention.

According to FIG. 1 and FIG. 2, o-ring seals 20 are disposed externally on valve cartridge 8 in the transition from region 18a to region 18c, externally at the front end on valve seat 14b and internally on core 15 or secondary armature guide tube 11b.

Valve cartridge 8 can, therefore, be introduced from side face 2c of pilot control housing 2 into valve bore (blind bore) 4, thus, already fixing solenoid system 6.

Since valve cartridge 8 is inherently matched as regards tolerance, only rough fixation is needed in axial direction, and this is ensured by molded pocket 5. The force built up when the internal pressure faces are pressurized for the first time pushes valve cartridge 8 against the housing stop, where it remains by virtue of friction due to the diverse o-rings of the static seals.

The force and stroke tolerances of valve cartridge 8 can be easily adjusted.

For the switching thresholds, the force tolerance of armature springs 10c, 11c, and, especially, of primary armature spring 10c, is the most important factor. The valve seat and armature guide tube of the primary side are sealingly joined to one another. The position of the joint can be found as a function of force. Thus, the armature spring force can be simply adjusted in the on-going process.

Subsequently, the armature guide tube and core 15 are joined to one another, for example, by flanging.

In this way, the stroke and force of the primary side are adjusted.

On the secondary side, an adjustment can be achieved by an adjustment to a specified spring force, or adjustment of a specified stroke.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A two-stage solenoid valve for an electropneumatic valve control unit, comprising:

a solenoid system energizable with a first and second current intensity;

a solenoid valve cartridge insertable into said solenoid system via a side of said valve control unit, said solenoid valve cartridge having a primary side connectable to at least one first compressed air port and a secondary side connectable to at least one second compressed air port, said solenoid valve cartridge having a stepped body and comprising a rear region, a front region, and a central region, wherein:

said rear region has a larger diameter than diameters of said front and central regions;

said front region houses a secondary armature spring;

said central region at least partly houses a primary armature and a secondary armature; and said rear region houses a primary armature spring;

a primary valve disposed on said primary side, said primary valve having said primary armature displaceable pre-loaded by said primary armature spring for bearing on at least one primary valve seat; and a secondary valve disposed on said secondary side, said secondary valve having said secondary armature displaceably pre-loaded by said secondary armature spring for bearing on at least one secondary valve seat, said secondary armature having a smaller cross section than said primary armature.

2. The solenoid valve according to claim 1, wherein valve seats of said front and rear regions are joined to said stepped body.

3. The solenoid valve according to claim 1, wherein an armature guide tube of said primary armature is housed at least partly in said central region.

4. The solenoid valve according to claim 1, wherein said primary valve and said secondary valve have a common core.

5. The solenoid valve according to claim 4, wherein said common core is formed in one piece.

6. The solenoid valve according to claim 1, wherein said secondary valve is disposed proximate a front region of said solenoid valve cartridge and said primary valve is disposed proximate a rear region of said solenoid valve cartridge.

7. The solenoid valve according to claim 1, wherein said primary side communicates with a compressed air port for supplying compressed air, and said secondary side communicates with a vent port for discharging compressed air.

8. The solenoid valve according to claim 1, wherein said primary valve is a 2/2-way valve.

9. The solenoid valve according to claim 1, wherein said secondary valve is a 3/2-way valve.

10. The solenoid valve according to claim 9, wherein said secondary valve has a first output for at least one of a control pressure port and an air admission port and a second output for said vent port.

11. The solenoid valve according to claim 10, wherein:

in a de-energized state, said primary valve is open and said secondary valve leaves said air admission port open and shuts off said vent port, at a first lower current intensity, said primary valve is closed and said secondary valve leaves said air admission port open and shuts off said vent port, and at a second higher current intensity, said primary valve is closed and said secondary valve releases said vent port and leaves said air admission port open, whereby said vent port and said air admission port are in communication with one another for venting.

12. The solenoid valve according to claim 1, wherein said solenoid valve cartridge is insertable into a blind bore of said valve control unit.

13. The solenoid valve according to claim 12, wherein said valve cartridge is insertable with said secondary side into said blind bore and is fixable in said blind bore by initial pressurization.

14. The solenoid valve according to claim 1, wherein said electropneumatic valve control unit is a pilot control unit of a pressure modulator.

15. The solenoid valve according to claim 2, wherein said valve seats of said front and rear regions are joined to said stepped body by at least one of flanging, caulking and welding.

16. The solenoid valve according to claim 1, wherein a spring constant of the primary armature spring is different than a spring constant of the secondary armature spring.

17. The solenoid valve according to claim 1, wherein said front region is formed continuously with said central region.

18. The solenoid valve according to claim 1, wherein said front region is disposed on said secondary side, said rear region is disposed on said primary side, and said central region is disposed between said front region and said rear region.

* * * * *

UNITED STATES PATENT AND TRADEMARK OFFICE
CERTIFICATE OF CORRECTION

| | | |
|---|---|---|
| PATENT NO. | : 8,539,979 B2 | Page 1 of 1 |
| APPLICATION NO. | : 12/311035 | |
| DATED | : September 24, 2013 | |
| INVENTOR(S) | : Dieter Frank et al. | |

It is certified that error appears in the above-identified patent and that said Letters Patent is hereby corrected as shown below:

In the claims:

Claim 1, in column 5, line 18 should be corrected as follows:

valve having said primary armature "displaceable" --displaceably--

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,539,979 B2
APPLICATION NO. : 12/311035
DATED : September 24, 2013
INVENTOR(S) : Frank et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Fifteenth Day of September, 2015

Michelle K. Lee
*Director of the United States Patent and Trademark Office*